Oct. 25, 1966  F. C. STEMPEL  3,280,626
METALLURGICALLY BONDED CIRCULAR FOIL HEATING RATE SENSOR
Filed Aug. 30, 1962

FRED C. STEMPEL
INVENTOR.

BY Nilsson & Robbins
ATTORNEYS ated Oct. 25, 1966

United States Patent Office 3,280,626

3,280,626
METALLURGICALLY BONDED CIRCULAR FOIL HEATING RATE SENSOR
Frederick C. Stempel, La Habra, Calif., assignor to Hy-Cal Engineering, Santa Fe Springs, Calif., a corporation of California
Filed Aug. 30, 1962, Ser. No. 220,432
4 Claims. (Cl. 73—190)

This invention relates generally to heat energy and temperature indicating devices, and more particularly to devices, and their method of manufacture, which measure heating or heat flow rates.

It is exceedingly useful, and often necessary, in modern instrumentation and other technological areas to be able to provide directly an electrical analog of a temperature or a heating rate, particularly in instances where the heat parameter to be measured is in a location remote from the observer.

When the quiescent temperature of a body, whether solid, liquid or gaseous, is the parameter to be observed, a simple thermocouple or a particular combination thereof may be utilized to measure the quantity to be monitored. Other thermometer devices such as gas bulb or bi-metallic strip types, for example, coupled with appropriate mechanical-to-electrical transducers, are also available and well known to practitioners in the art.

When, however, the heat parameter of interest is the rate of change of temperature of a body or the rate at which heat is received, such temperature indicators are subject to severe limitations. One fundamental such limitation is that the rate of heat flow is not given by the sensor directly, but must be obtained by differentiating with respect to time the record of the temperature change given by the sensor. This may require several steps involving several sources of errors and considerable delay. Furthermore, preliminary signal conditioning of the sensor, calibration, the maintaining of stable reference temperatures, and other related problems seriously reduce its utility and reliability.

Typical attempts in the prior art to provide heating rate sensors have been directed toward the development of slope-type or slug calorimeters. In such a sensor, a small, thermally conductive disc or slug has a front face exposed toward the source of the heat. Affixed in thermal contact with the opposite face of the disc is a sensing thermocouple junction. A reference junction at a known temperature is maintained in thermal isolation from the sensing junction, and the system is calibrated. When the slug or disc, which is usually blackened, is exposed to the incident heat energy, the time record or history of the temperature of the slug may be recorded. From such a record and knowing the specific heat and other characteristics of the particular slug and thermocouple junction, the average rate of heating over any period of time may be computed by judiciously time differentiating the temperature curve for that period of time. That is, in more general terms, knowing the geometrical and thermal characteristics of an otherwise thermally isolated mass, and obtaining its temperature versus time history after exposure to a source of heat, it is possible to solve mathematically for the rate of heating from the source.

It follows that the temperature versus time history of the slug will not be an accurate record of the incident heat if the slug is not otherwise thermally isolated. In this connection, the electrical leads to the slug and its mounting means represent potentially serious sources of error and the lack of repeatability of measurements between different instruments and between different experiments with the same sensor or even between different portions of the same experiment, because of the effects of corrosion and ablation and the like due to the heat and other aspects of the environment of the experiment. In addition, each slug-type sensor must be separately calibrated, usually after having been mounted in place. In addition, data reduction and subsequent computation are complex and time consuming.

A more basic limitation and disadvantage of such prior art sensors, however, is that they are inherently an integrating instrument for indicating the total energy received for a stated period of time. Such instruments cannot therefore measure rapidly fluctuating heat rates or temperature transients. In many instances such transients are of more critical and important interest than the integrated heat. This is particularly true in, for example, the measurement of conditions within an internal combustion engine, plasma tunnels, in surveying the thermal flux from quartz lamp heaters, and the like.

It is therefore an object of the present invention to provide a heat sensor which is not subject to these and other disadvantages of the prior art.

It is another object to provide a heat rate sensor which generates directly the electrical analog of the rate of heat at any instant of time.

It is another object to provide a method of manufacturing such a heat rate sensor.

It is another object to provide a heat rate sensor having a time response to transients of the order of a few milliseconds or less.

It is another object to provide such a heat rate sensor which may view and receive heat from a 180° solid angle.

It is another object to provide a heat rate sensor which is highly repeatable in its measuring characteristics from sensor to sensor and stable from experiment to experiment over a temperature range of thousands of degrees.

It is another object to provide such a heat rate sensor which is extremely rugged with regard to thermal and mechanical shock as well as to extreme temperatures.

It is another object to provide such a heat rate sensor which does not require separate calibration, special signal conditioning, or the maintenance of a separate body at a reference temperature.

Briefly, these and other objects are achieved in accordance with an example of one aspect of the present invention in which a circular constantan foil disc is metallurgically bonded along its entire periphery to a more massive copper heat sink block. The block is relieved from the disc in the region within the peripheral metallurgical bond as by a circular or conical bore into the block and a fine copper wire is metallurgically bounded to the center of the constantan disc. The copper wire is otherwise insulated from the sensor.

Thusly an intercoupled pair of thermocouple junctions are provided: one being the peripheral metallurgical bond; and the other, the central copper wire to constantan disc. A galvanometer is then coupled between the copper wire and the copper heat sink block. Any temperature difference between the two junctions is manifest as a voltage reading on the galvanometer or on any standard millivolt readout device.

When the surface of the disc opposite from the copper block and the copper wire is exposed to a source of heat, such as radiant heat or hot gases, the disc tends to become heated. However, the relatively massive copper block and therefore the peripheral junction do not tend to become heated during a short term and, over the long term, vastly lag the temperature of the disc at its center junction because of the relatively high thermal impedance of the thin constantan disc. Even though the block may be slowly attaining higher temperature, it will cause no more than a second order degradation because of the self-regulating nature of the two junctions: as the peripheral temperature increases, the conduction to the disc decreases because of the lower gradient; but the lower conduction causes the center of the disc to rise to a higher temperature thusly compensating for the higher peripheral temperature. This effect can continue for so long as the temperature of the center junction is much less than the effective temperature of the heat source.

The precision location of all segments of the peripheral junction as well as the nature of the junction have been discovered to be critical in providing repeatability of characteristics of the successive sensors. The metallurgical peripheral bond utilized in the method and apparatus of the invention will be discussed below.

In accordance with another example of the invention, the heat sink block may be shielded from the heat source and may, when desired, be forced cooled to keep the constant temperature far removed from the effective temperature of the heat source and to preclude any of the sensor components from melting or vaporizing.

Further details of these and other novel features and their operation, as well as additional objects and advantages will become apparent and be best understood from a consideration of the following description taken in connection with the accompanying drawings which are all presented by way of illustrative examples only, and in which.

Figure 4:
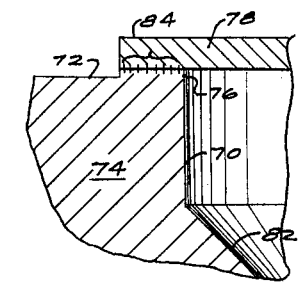
Figure 5:
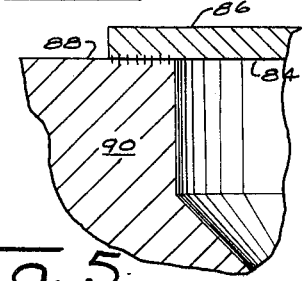
Figure 6:
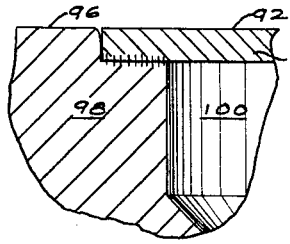

FIG. 4, FIG. 5, and FIG. 6 are sectional views of additional examples of the invention.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is defined by the appended claims forming a part of this specification.

Figure 1:
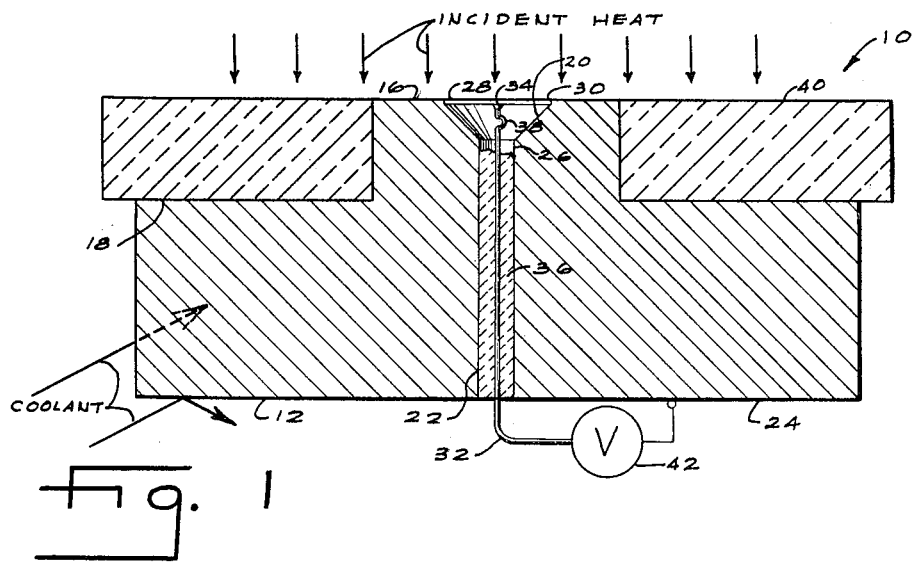
FIG. 1 is a cross-sectional view of an example of an assembled heating rate sensor constructed in accordance with the principles of the present invention.

Referring to FIG. 1, a heat rate sensor 10 is illustrated as including a heat sink body 12 having a raised portion 14 in the form of a right circular cylinder. The raised portion 14 has a top surface 16 which is substantially planar and which is, in this example, parallel with the remainder of the front surface 18 of the heat sink member 12. The raised portion 14 is relieved from the top surface 16 by a conical depression 20, the base of which is a circle disposed contiguously to the top surface 16. A passageway 22 communicates from the back surface 24 of the sink member 12 to the apex region 26 of the conical depression 20. The top surface 16, the conical depression 20 and the passageway 22 are all, in this example, concentric.

A metal foil sensing disc 28 is disposed over the conical depression 20 and lies with its top surface substantially coincident with the plane of the top surface 16. The circular periphery of the foil sensing disc 28 is metallurgically bonded to the circular base on the conical depression 20. The metallurgical bond 30 is thus circular with a constant diameter.

A fine conductive strand 32, preferably of the same metallic composition as the heat sink member 12, is disposed along the axis of the passageway 22 and is metallurgically bonded to the foil sensing disc 28 at its center 34. An axially relieved ceramic sleeve 36 is disposed about the conductive strand 32 within the passageway 22 to insulate electrically and thermally the strand from the heat sink member 12. An expansion loop 38 may be provided in the strand 32 between the ceramic sleeve 36 and the metallurgical bond at the center 34 of the disc 28.

Disposed about the circular raised portion 14 of the heat sink member 12 may be disposed a heat shield member 40. The thickness of the heat shield 40 may be approximately equal to the axial length of the raised portion 14. When it is not required that the sensing disc 28 view the incident heat with a 180° solid angle, the heat shield 40 may have a thickness greater than the axial length of the raised portion 14 and extend over the top surface 16 thereof to the region of the metallurgical bond 30.

To complete the instrument schematically, a galvanometer 42 may be coupled between the conductive strand 32 and the heat sink member 12.

In a particular constructed example of the present invention, the sensor 10 had a thickness from the back surface 24 to the top surface 16 of .3 inch and was fabricated from copper. The diameter of the raised portion 14 was ⅛ of an inch and the diameter of the foil sensing disc 28 was 1/16 of an inch. The sensing disc was fabricated of constantan alloy and was approximately .002 inch in thickness. The heat shield 40 was formed of phenolic asbestos which had a conductivity approximately equal to that of air. The conductive strand 32 was a copper wire having a diameter of .001 inch.

The sensor thusly constructed is exceedingly rugged and reliable. In addition, the repeatability of the measuring characteristics of the sensors manufactured successively is substantially perfect. The sensors are not subject to degradation in performance even after experiencing extreme mechanical and thermal shocks. Such heat rate sensors have been utilized in environments including temperatures of thousands of degrees Fahrenheit without subsequently degraded measuring performance. The transient measuring capability of the heat sensors constructed with the above dimensions and geometry is of the order of 1 millisecond.

The metallurgical bond 30 as will be discussed in more detail below in connection with the subsequent figures, is a pure metal junction containing no alloys or metals other than those in the composition of the foil disc 28 and the heat sink member 12. Thus the bi-metallic thermocoupled junction does not rely on a fusing third metal which may contain inconsistent impurities and introduce non-repeatable errors in the measuring characteristics of succesively manufactured sensors. Further, the metallurgical bond 30 is neither subject to deterioration due to melting or vaporization of material such as solder, nor is the metallurgical bond subject to or exposed to corrosive effects which could cause variations in errors in measuring characteristics between experiments.

In operation, the incident heat indicated by the downwardly directed vectors in the figure causes the foil sensing disc 28 to rise in temperature particularly near its center which is at a greater distance from the cool heat sink member 12 than the metallurgical bond 30 at the periphery of the disc. Thus the temperature of the center 34 may rise to a temperature dependent upon the rate of incident heat and the conductivity of the foil sensing disc 28. That is, the greater the incident heat or the less the conductivity of the disc 28 the higher will be the attained temperature of the center 34 of the disc. The incident heat thus creates and maintains a temperature gradient radially across the disc from its center to its periphery.

When desired, the heat sink member 12 (FIGURE 1) is force cooled by the flow of coolant indicated by arrow-bearing lines, therethrough or over its back surface 24.

The voltage reading of the galvanometer 42 is not critically dependent upon the position of the metallurgical bond between the conductive strand 32 and the bottom of the foil sensing disc 28. That is, the metallurgical bond between the strand and the disc may be slightly off-center without adverse results. However, the radial position of all the segments of the peripheral thermocouple junction at the metallurgical bond 30 is critical and must be maintained constant in order for successively manufactured sensors to have repeatable measurement characteristics.

Figure 2:
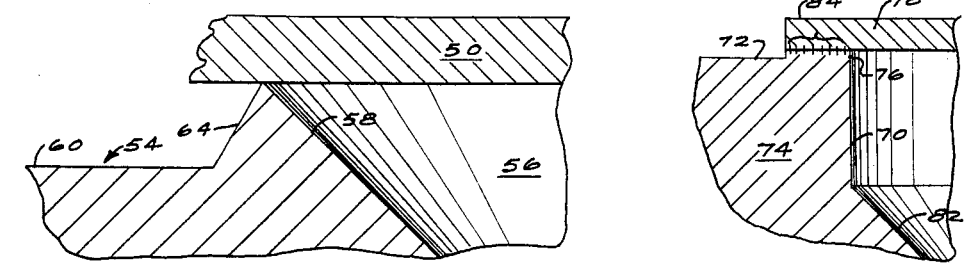
FIG. 2 is a cross-sectional view of a portion of an alternative example of the invention prior to assembling.
Figure 3:
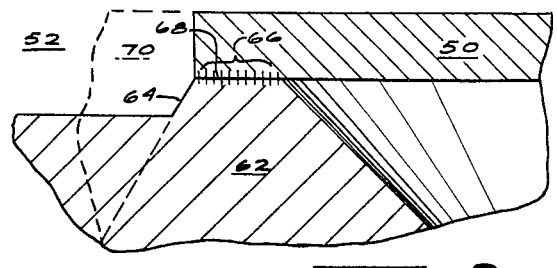
FIG. 3 is a view of the structure shown in FIG. 2 after assembling.

Referring to FIG. 2 and FIG. 3, the process of metallurgically bonding a segment of sensing foil 50 to a heat sink member 52 in a manner which does not require bulky or massive or viewing angle restricting fastening means is illustrated. In addition, the securing process does not require the use of any significant radial thickness for the sensing member radially outside of the sensing disc periphery. In FIG. 2 it is seen that the top surface 54 of the heat sink member 52 has been relieved to form a conical depression 56 having a conical surface 58 which is, in this example, disposed at an angle of 45° with respect to the normal of the top surface 54. In addition to the relieving for the conical depression 56, the top surface is shown to have been relieved parallel to itself to form a substantially planar portion 60. In the process of relieving the top surface 54 to the planar portion 60 an annular ridge portion 62 is preserved having an outer conical surface 64 disposed at an angle of approximately 30° to the normal of the planar portion 60. When the top surface 54 has thusly been prepared, the segment of sensing foil 50 is placed thereover in a manner to cover the conical depression 56 and the metallurgical bond 66 shown in FIG. 3 is formed. The metallurgical bond 66 may be achieved by electric welding, ion beam bombardment, chemically induced fusion or the like. In such a bond, it is clear that no additional metal or alloys are disposed or fused between the metal of the sensing foil 50 and that of the heat sink member 62. When other such metals are utilized to form the bond, the probability of corrosion as from galvanic action and deterioration in other aspects such as melting or vaporizing, it is vastly increased. In addition, when a third metal is utilized in the bond the thermocouple comprises a pair of bi-metallic junctions instead of one and represents a source of non-repeating errors.

In the bonding process the electrically higher resistance peak of the ridge 62 is fused down to the mesa surface 68 along which the metallurgical bond 66 is disposed as illustrated in FIG. 3. For the purposes of providing a heat rate sensor having an overall smaller diameter than that described in connection with FIG. 1, the outer conical surface 64 may be extended downwardly from the metallurgical bond 66. In addition, when desired, a heat shield 70 shown in dotted lines may be installed about the sensing foil 50 to shield the body of the heat sink member 62 from the incident heat to which the sensing foil is exposed.

After the bond 66 has been formed, the excess foil in the segment of foil 50 is removed so that no foil material extends radially outside of the circular metallurgical bond 66.

Referring to FIG. 4, an example of the invention is illustrated in which the top surface 72 of a heat sink member 74 has been relieved to form a ridge 76 which does not have conical side surfaces but rather has ridge sides which are normal to the top surface 72. The portion of the heat sink body 74 which is relieved under the sensing disc 78 defines a depression having a cylindrical side portion 70 near the ridge 76 and continuing therefrom to a conical surface 82 which extends downwardly towards its apex deeper within the heat sink member 74.

The thin metallic foil of the sensing disc 78 is secured to the sink member 74 by means of a metallurgical bond 84 which may be similar in all respects to the metallurgical bond 66 illustrated in FIG. 3. Again as in the process discussed in connection with the earlier figures, the foil segment of the sensing disc 78 may be pared off and removed so that the foil does not extend radially beyond the boundaries of the metallurgical bond 84.

In FIG. 5 an embodiment of the invention is illustrated in which the back surface 85 of a foil sensing disc 86 is substantially coplanar with the top surface 88 of the heat sink member 90. A ridge, not shown, may exist initially and be diffused down in the bonding process or the metallurgical bond may be achieved without the ridge even initially. When the bonding is achieved by electric welding, the current requirements of the welding equipment are considerably increased when a relatively low resistance pointed ridge as shown in FIG. 2 is not provided as an initial step in the process.

The sectional view of FIG. 6 illustrates an example of the invention in which the top surface 92 of a heat sensing disc 94 is disposed substantially coplanarly with the top surface 96 of a heat sink member 98. This structure results from the process of metallurgically bonding the foil material to the periphery of the depressed region 100 in the heat sink member 98; paring off the excess foil which is disposed radially outside of the metallurgical bond about the circular periphery of the depressed region; and then pressing the very thin foil member into the soft copper heat sink member 98. The entire top surface of the heating rate sensor may then be smooth and flush, which is particularly advantageous when the heating rate sensor is to be installed adjacently to a body of rapidly moving heated gases as in aircraft or rocket surfaces.

There has thus been disclosed a number of examples and embodiments of heating rate sensors constructed in accordance with the principles of the invention and which exhibit the advantages and achieve the objects set forth above.

What is claimed is:

1. A heating rate sensor comprising: a heat sink member of a first metallic composition having front and back surfaces, said front surface including a raised portion having a circular cross-section and a circular top surface, said raised portion being centrally relieved from said top surface to form a conical depression therein having a base forming a circle concentric with said circular top surface, said heat sink member being centrally relieved for a passageway communicating from the apex region of said conical depression to said back surface; a sensing foil disc of a second metallic composition having substantially planar front and back surfaces and being metallurgically bonded to said heat sink member continuously along the entire circular periphery of said base and forming therewith an annular cold junction having a constant inner diameter, said back surface and foil disc being disposed toward said conical depression and said front surface of said foil disc being disposed outwardly therefrom and being disposed substantially coplanarly with said top surface of said raised portion of said heat sink member; a conductive strand of said first metallic composition disposed through said passageway and being metallurgically bonded to the center of said back surface of said foil disc; a thermally and electrically insulated sleeve disposed in said passageway about said strand; connection means for manifesting electrical signals developed between said heat sink member and said conductive strand; and a thermally non-conductive shield disposed over that portion of said front surface of said heat sink member about said raised portion, the structural metallurgical bonds formed and disposed between said heat sink member and said sensing foil disc and between said conductive strand and said sensing foil disc consisting purely of combinations of said first and second metallic compositions.

2. The invention according to claim 1 in which said thermally and electrically insulated sleeve is composed of ceramic.

3. The invention according to claim 1 in which said first metallic composition is substantially copper and said second metallic composition is constantan.

4. The invention according to claim 1 in which said conductive strand defines a loop in that portion of said strand disposed in said conical depression between said foil disc and said insulated sleeve for relieving stresses along the length of said strand.

(References on following page)

References Cited by the Examiner

UNITED STATES PATENTS

| | | | |
|---|---|---|---|
| 2,393,196 | 1/1946 | Schwarz | 136—4 |
| 2,483,350 | 9/1949 | Polye et al. | 136—4.73 |
| 2,677,711 | 5/1954 | Ray | 136—4.62 |
| 2,935,711 | 5/1960 | Christensen | 73—355 X |
| 2,938,424 | 5/1960 | Herriott. | |
| 3,069,752 | 12/1962 | Sherning | 29—155.5 |

OTHER REFERENCES

Gardon, R.: "An Instrument for the Direct Measurement of Intense Thermal Radiation," in The Review of Scientific Instruments 24(S), pages 366–370, May 1953.

RICHARD C. QUEISSER, *Primary Examiner*.

ALLEN B. CURTIS, *Examiner*.

J. C. GOLDSTEIN, *Assistant Examiner*.